(12) United States Patent
Zhou et al.

(10) Patent No.: US 10,958,436 B2
(45) Date of Patent: Mar. 23, 2021

(54) METHODS CONTRACT GENERATOR AND VALIDATION SERVER FOR ACCESS CONTROL OF CONTRACT DATA IN A DISTRIBUTED SYSTEM WITH DISTRIBUTED CONSENSUS

(71) Applicant: Industrial Technology Research Institute, Hsinchu (TW)

(72) Inventors: Jiazheng Zhou, Taipei (TW); Shih-Fang Chang, Taoyuan (TW); Ya-Wen Lee, Chiayi (TW); Shih-Chang Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 287 days.

(21) Appl. No.: 15/857,154

(22) Filed: Dec. 28, 2017

(65) Prior Publication Data

US 2019/0207770 A1     Jul. 4, 2019

(51) Int. Cl.
*H04L 9/32* (2006.01)
*G06F 21/62* (2013.01)
*H04L 9/06* (2006.01)
*G06Q 50/18* (2012.01)

(52) U.S. Cl.
CPC ........ *H04L 9/3247* (2013.01); *G06F 21/6209* (2013.01); *H04L 9/0637* (2013.01); *G06Q 50/18* (2013.01)

(58) Field of Classification Search
CPC ... H04L 63/101; H04L 9/3247; H04L 9/0637; G16H 10/60; G06Q 50/18; G06F 21/6209

USPC .......................................................... 713/176
See application file for complete search history.

(56) References Cited

U.S. PATENT DOCUMENTS

| | | | |
|---|---|---|---|
| 5,313,637 A * | 5/1994 | Rose | G06F 21/31 340/5.74 |
| 9,641,342 B2 | 5/2017 | Sriram et al. | |
| 9,667,427 B2 | 5/2017 | Oberhauser et al. | |
| 9,992,022 B1 * | 6/2018 | Chapman | H04L 63/0861 |
| 2008/0275798 A1 | 11/2008 | Moduga et al. | |
| 2014/0136268 A1 | 5/2014 | Zeng et al. | |

(Continued)

FOREIGN PATENT DOCUMENTS

| | | |
|---|---|---|
| CN | 105488722 A | 4/2016 |
| CN | 105610578 A | 5/2016 |

(Continued)

*Primary Examiner* — Bryan F Wright

(57) ABSTRACT

Methods for access control of contract data in a distributed system are provided. The distributed system includes a contract generator, a validation server, a database and a distributed ledger which are in communication via a network, the method including the steps of: at the contract generator, receiving digital contract data from a first electronic device, determining a permission setting for accessing contract content associated with the digital contract data based on the digital contract data, and setting the permission setting to the validation server via the network, obtaining a validation link corresponding to the digital contract data from the validation server, generating contract information for digital contract data according to partial content of the digital contract data and the validation link, and storing the contract information in the distributed ledger.

20 Claims, 7 Drawing Sheets

(56) References Cited

U.S. PATENT DOCUMENTS

| | | |
|---|---|---|
| 2015/0304296 A1* | 10/2015 | Brown .................. G06F 21/604 726/5 |
| 2015/0332283 A1 | 11/2015 | Witchey |
| 2016/0191243 A1 | 6/2016 | Manning |
| 2016/0260169 A1 | 9/2016 | Arnold et al. |
| 2016/0260171 A1 | 9/2016 | Ford et al. |
| 2016/0261404 A1 | 9/2016 | Ford et al. |
| 2016/0283920 A1 | 9/2016 | Fisher et al. |
| 2016/0292672 A1 | 10/2016 | Fay et al. |
| 2016/0292680 A1 | 10/2016 | Wilson et al. |
| 2016/0300234 A1 | 10/2016 | Moss-Pultz et al. |
| 2016/0306982 A1 | 10/2016 | Seger, II et al. |
| 2016/0371771 A1 | 12/2016 | Serrano et al. |
| 2017/0011460 A1 | 1/2017 | Molinari et al. |
| 2017/0031874 A1 | 2/2017 | Boudville |
| 2017/0046526 A1 | 2/2017 | Chan et al. |
| 2017/0048216 A1 | 2/2017 | Chow et al. |
| 2017/0070484 A1 | 3/2017 | Kruse et al. |
| 2017/0075941 A1 | 3/2017 | Finlow-Bates |
| 2017/0083860 A1 | 3/2017 | Sriram et al. |
| 2017/0083907 A1 | 3/2017 | McDonough et al. |
| 2017/0103385 A1 | 4/2017 | Wilson, Jr. et al. |
| 2017/0103390 A1 | 4/2017 | Wilson, Jr. et al. |
| 2017/0103391 A1 | 4/2017 | Wilson, Jr. et al. |
| 2017/0111175 A1 | 4/2017 | Oberhauser et al. |
| 2017/0116693 A1 | 4/2017 | Rae et al. |
| 2017/0124556 A1 | 5/2017 | Seger, II |
| 2017/0126702 A1 | 5/2017 | Krishnamurthy |
| 2017/0131988 A1 | 5/2017 | Boudville |
| 2017/0132625 A1 | 5/2017 | Kennedy |
| 2017/0134162 A1 | 5/2017 | Code et al. |
| 2017/0177855 A1 | 6/2017 | Costa Faidella et al. |
| 2017/0206523 A1 | 7/2017 | Goeringer et al. |
| 2018/0060496 A1* | 3/2018 | Bulleit .................. G16H 10/60 |
| 2018/0248880 A1* | 8/2018 | Sardesai ............... H04L 63/101 |
| 2018/0341648 A1* | 11/2018 | Kakavand ............. G06Q 50/18 |
| 2019/0034404 A1* | 1/2019 | Anderson ............. H04L 9/0637 |

FOREIGN PATENT DOCUMENTS

| | | |
|---|---|---|
| CN | 106204287 A | 12/2016 |
| CN | 106209877 A | 12/2016 |
| CN | 106230592 A | 12/2016 |
| CN | 106504008 A | 3/2017 |
| TW | M486799 | 9/2014 |
| TW | M540328 | 4/2017 |
| TW | M542178 | 5/2017 |
| TW | M543413 | 6/2017 |
| TW | M549917 | 10/2017 |
| TW | 201741956 A | 12/2017 |
| WO | WO 2017021153 | 2/2017 |

* cited by examiner

METHODS CONTRACT GENERATOR AND VALIDATION SERVER FOR ACCESS CONTROL OF CONTRACT DATA IN A DISTRIBUTED SYSTEM WITH DISTRIBUTED CONSENSUS

TECHNICAL FIELD

The technical field relates to distributed systems and related methods of digital contract data validation and access control based on distributed consensus and contract generators and validation servers in the distributed system thereof.

BACKGROUND

A contract is a legal act established by parties on the basis of the meaning of the agreement. The most important thing is that rights of both parties can be guaranteed during the transaction. However, the contract is the last line of defense when problems or ambiguities arise, and there is a need for a fair third party other than the parties to verify the contract. For example, a party A may rent a car from a party B of the car rental company, and the insurance company (third party) wants to verify the contractual contents of party A and party B to charge the insurance fee. In other case, party A may purchase the airline ticket from party B of the tourism industry, and the government (the third party) may want to check the collection and payment receipt of the transaction between party A and party B. Contract validation and contract form are inseparable, the contract of the traditional written form has gradually been replaced by the electronic or digital contract, and the validation method has also been changed from manpower to systematization.

Due to the recent development of blockchain/distributed ledger technology, a non-tampered and distributed database is provided that allows many developers to combine their original applications with blockchain/distributed ledgers. After the contract is digitized, it can speed up transactions and promote business development. Blockchain technology takes transaction information, encapsulates it in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added.

When it is necessary to provide a third-party validation beyond the parties, the validation will be much easier if there is a same basis of recognition. Based on the same basis of recognition, the differences identified by the contract itself (such as the authenticity of the contract) can be resolved. Distributed consensus architecture provided by the distributed ledger can ensure that information written is not tampered with and data seen by everyone is consistent, thus eliminating the possibility of contract data being tampered with.

The distributed ledger records all the transactions that take place on the network. In addition to being distributed and collaborative, the information recorded to a blockchain is append-only, using cryptographic techniques that guarantee that once a transaction has been added to the ledger it cannot be modified. This property of immutability makes it simple to determine the provenance of information because participants can be sure information has not been changed.

Moreover, information currently stored in the distributed consensus system (e.g., distributed ledger/blockchain) can only guarantee that the information that everyone sees is consistent; however, the validity of the data cannot be verified, that is, the data reality cannot be guaranteed. In addition, data in the distributed consensus system cannot express the complete content due to the limitation of the data size. When considering the privacy issue, it is not suitable to expose the data to the distributed consensus system.

SUMMARY

Accordingly, embodiments of the disclosure provide distributed systems and related methods of access control of contract data. In one aspect of the disclosure, a computer-implemented method for access control of contract data in a distributed system with distributed consensus is provided, wherein the distributed system comprises a contract generator, a validation server, a first storage device storing a database and a second storage device providing a distributed ledger and the contract generator, the validation server, the first storage device and the first storage device are in communication via a network. The method comprises the following steps: receiving, at the contract generator, digital contract data from a first electronic device via the network; determining, at the contract generator, whether a digital contract template associated with the digital contract data already exists in the database of the first storage device; in response to determining that the digital contract template associated with the contract data already exists in the database, determining, at the contract generator, a permission setting for accessing contract content associated with the digital contract data based on the digital contract data, and setting the permission setting associated with the digital contract data to the validation server via the network; obtaining, at the contract generator, a validation link corresponding to the digital contract data for validating the permission setting associated with the digital contract data from the validation server via the network; generating, at the contract generator, digital contract information for the digital contract data according to partial content of the digital contract data and the validation link; and storing, at the contract generator, the digital contract information in the distributed ledger of the second storage device, wherein accessing of a complete content of the digital contract data is controlled based on the validation link.

In another aspect of the disclosure, a contract generator for access control of contract data in a distributed system with distributed consensus is provided which comprises a network interface, a memory and a processor. The network interface is coupled to a validation server, a distributed ledger and a database via a network. The processor is coupled to the network interface and the memory and is configured to perform the following operations: receiving digital contract data from a first electronic device via the network; determining a permission setting for accessing contract content associated with the digital contract data based on the digital contract data, and setting the permission setting associated with the digital contract data to the validation server via the network; obtaining a validation link for validating the permission setting associated with the digital contract data from the validation server via the network; generating digital contract information for the digital contract data according to partial content of the digital contract data and the validation link; and storing the digital contract information in the distributed ledger of the second storage device, wherein accessing of a complete content of the digital contract data is controlled based on the validation link.

In another aspect of the disclosure, a validation server for access control of contract data in a distributed system with distributed consensus is provided which comprises a network interface, a memory and a processor. The network interface is coupled to a distributed ledger storing digital contract information of digital contract and a database via a network, wherein the digital contract information of digital contract data includes partial content of the digital contract data and a validation link. The processor is coupled to the memory and the network interface and is configured to perform the following operations: receiving an accessing request from a first electronic device for retrieving the digital contract information corresponding to digital contract data from the distributed ledger via the network; obtaining the validation link from the digital contract information; performing a permission validation process to determine whether the first electronic device has the permission to read the digital contract data using the validation link; rejecting the accessing request from the first electronic device in response to determining that the first electronic device has no permission to read the digital contract data; and generating a complete content of the digital contract data based on a digital contract template associated with the digital contract data from the database and the partial content of the digital contract data and transmitting the complete content of the digital contract data to the first electronic device in response to determining that the first electronic device has the permission to read the digital contract data.

Other aspects and features of the present disclosure will become apparent to those with ordinarily skill in the art upon review of the following descriptions of specific embodiments of methods for use in a distributed system.

BRIEF DESCRIPTION OF DRAWINGS

The disclosure can be more fully understood by reading the subsequent detailed description and examples with references made to the accompanying drawings, wherein.

DETAILED DESCRIPTION OF EMBODIMENTS

Figure 1:
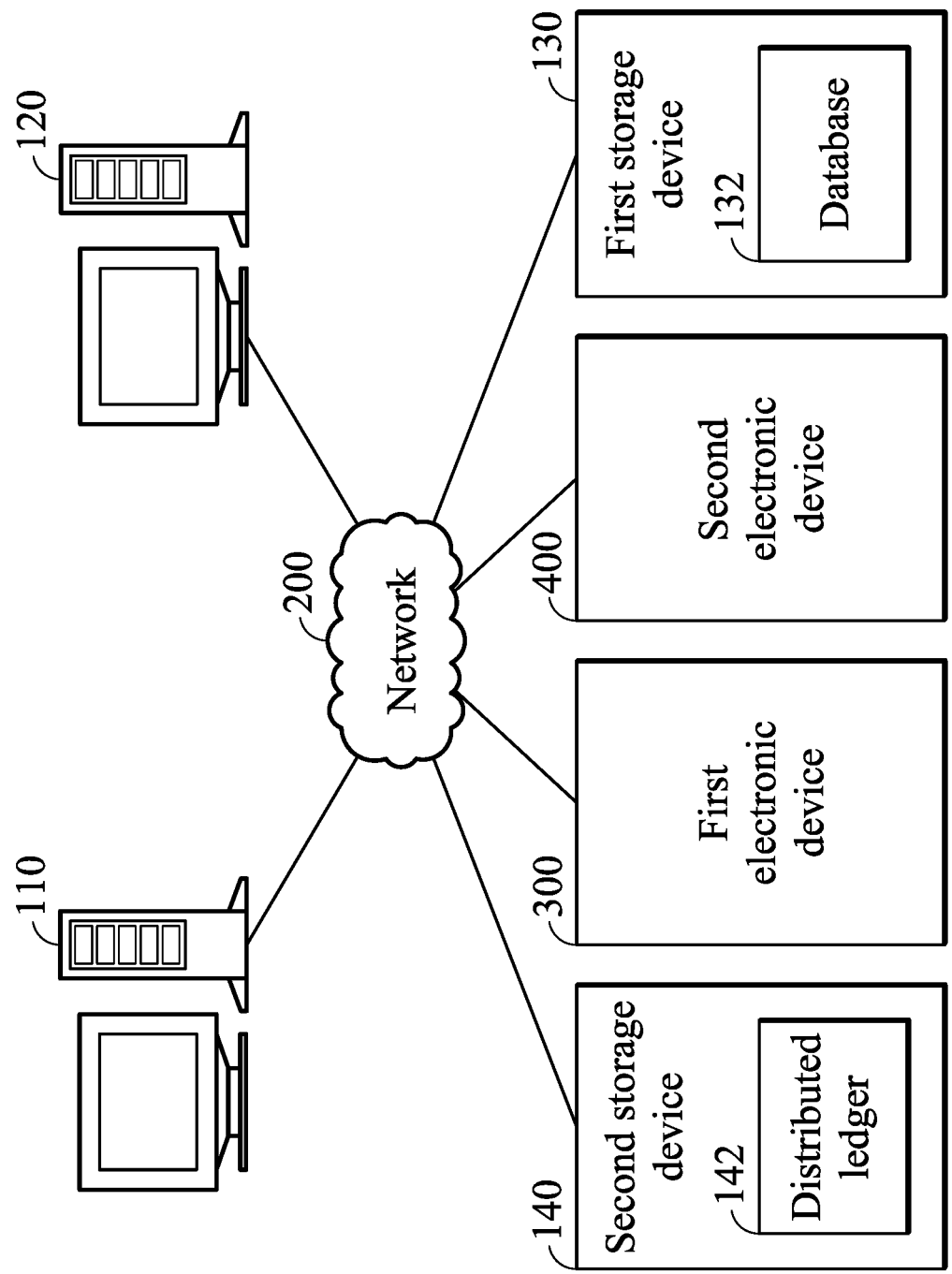
FIG. 1 is a schematic diagram of a distributed system according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It could be understood that the embodiments may be realized in software, hardware, firmware, or any combination thereof.

Embodiments of the application provide distributed systems with distributed consensus (e.g., a distributed ledger) and methods for access control of contract data thereof, which can make the contract transparent and provide an access way to verify the integrity of whole contract content. By the distributed system with distributed consensus and methods for access control of contract data thereof of the present disclosure, the contract data can be permanently recorded in a tamper resist distributed storage media (e.g., a distributed ledger) to prevent the contract data from being tamper with, thus ensuring and improving the authenticity of the contract. Moreover, only the relevant parties with sufficient authority/permissions are allowed to verify the complete contract content, so that the complete contract content cannot be verified or accessed by unauthorized persons, thus protecting the contract content and preventing the disclosure of personal privacy in the contract data.

FIG. 1 is a schematic diagram of a distributed system 100 according to an exemplary embodiment. The distributed system 100 may at least comprise a contract generator 110, a validation server 120, a first storage device 130, and a second storage device 140. The first storage device 130 further stores a database 132. The second storage device 140 further provides a distributed ledger 142. The contract generator 110, the validation server 120, the database 132, and the distributed ledger 142 are in communication via a network 200, which may be any wired/wireless communications networks, such as the INTERNET, 3G, and/or WLAN network, blue-tooth network and so on, to perform communication and data transmission therebetween. For example, the contract generator 110 may read data from the database 132 of the first storage device 130 and write data into the database 132 of the first storage device 130 via the network 200. Similarly, the contract generator 110 may read data from the distributed ledger 142 of the second storage device 140 and write data into the distributed ledger 142 of the second storage device 140 via the network 200.

The distributed system 100 may be further coupled to one or more electronic devices, such as a first electronic device 300 and a second electronic device 400 for perform communication and data transmission therebetween. In some embodiments, each of the first electronic device 300 and the second electronic device 400 can be a mobile device, such as a PDA (Personal Digital Assistant), a smart phone, a mobile phone, an MID (Mobile Internet Device, MID), a laptop computer, a car computer, a digital camera, a multi-media player, a game device, or any other type of mobile computational device, however, it is to be understood that the disclosure is not limited thereto. The contract generator 110 is configured to receive digital contract data from an electronic device (e.g., the first electronic device 300) via the network 200, set permission associated with the received digital contract data, and store digital contract information corresponding to the received digital contract data to the distributed ledger 142 of the second storage device 140.

To be more specific, in operation, the contract generator 110 may receive digital contract data from a user of the electronic device who request to store a contract data and queries the database 132 to determine whether a contract type associated with the digital contract data exists in the database 132. If the contract type exists in the database 132, the contract generator 110 transmits the permission setting to the validation server 120 to set the associated authority and obtains a validation link 230 from the validation server 120 via the network 200. The contract generator 110 then obtains partial content of the digital contract data in which the privacy or secure relevant information in the digital contract data, such as full name, ID card number, address and other user personal data, is removed from the digital contract data, and combines the partial content of the digital contract data together with the validation link to output digital contract information, and writes the digital contract information to the distributed ledger 142 to prevent contract information from being tamper with.

Figure 2:
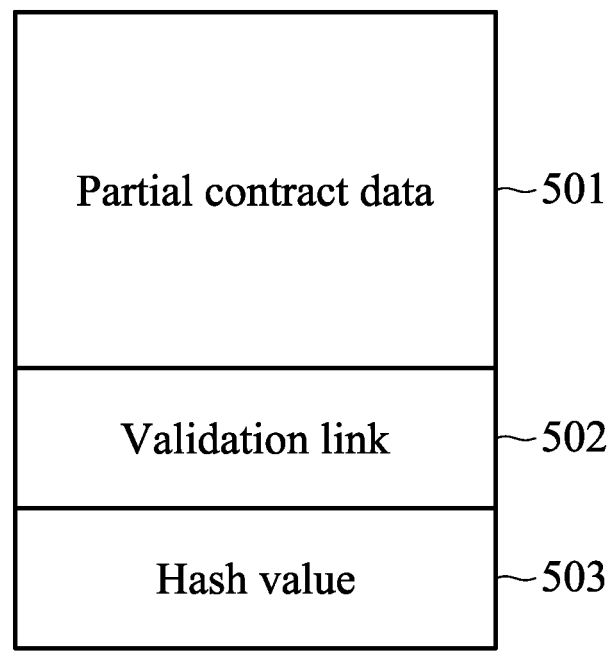
FIG. 2 is a schematic diagram illustrating an exemplary digital contract information stored in the distributed ledger according to an embodiment.

FIG. 2 is a schematic diagram illustrating exemplary digital contract information stored in the distributed ledger according to an embodiment. As shown in FIG. 2, in the distributed ledger 142 (e.g., a block of the blockchain), digital contract information 500 includes partial contract data 501, a validation link (e.g., a validation URL) 502 and a hash value 503, wherein the hash value 503 can be calculated by applying a hash function on the partial contract data 501 and the validation link 502. Hashing is used to encrypt and decrypt data being transmitted over the network (used to authenticate message senders and receivers). It is used to ensure that transmitted messages or data have not been tampered with. For example, the sender generates a hash of the message, encrypts it, and sends it with the message itself. The recipient then decrypts both the message and the hash, produces another hash from the received message, and compares the two hashes. If they're the same, there is a very high probability that the message was transmitted intact. A hash value generated by a specific hash function is irreversible so that information being hashed can be protected. For a given hash, there is no practical way to calculate the original input and thus it is difficult to forge. There are several well-known hash functions used, including the message-digest hash functions MD2, MD4, and MD5, and the Secure Hash Algorithm (SHA).

In this embodiment, the validation link 502 is a uniform resource identifier (URI) for validating the permission setting associated with the contract information. The URI is a string of characters used to identify a resource. Such identification enables interaction with representations of the resource over a network using specific protocols. For example, the URI can be in the form of the uniform resource locator (URL) or Uniform Resource Name (URN), such as a hyper link of "http://www.aaa.bbb.cc/#0001" or an application link of "APP1://20170901001", but the disclosure is not limited thereto. In some embodiments, the digital contract information may further include an electronic signature or a digital signature (not shown) in addition to the partial contract data, the validation link, and the first hash value for the contract data.

Thereafter, after the contract information has been stored into the distributed ledger 142, the user may retrieve the digital contract information from the distributed ledger 142 through the validation server 120. The previously obtained contract information is retrieved and the validation link within the digital contract information is obtained and sent to the validation server 120 which validates in the database 132 whether the user has the authority/permission to view or access the complete contract data to verify the digital contract data. If the user has permission for viewing or accessing the digital contract data, the validation server 120 combines the partial contract data that only have partial necessary contract information excluding the user personal data together with user personal data stored in the database 132 using a corresponding contract type of the digital content template to generate a complete contract content and returns it via the network 200 to the validated user. In other words, the digital contract information of a specific contract stored in the distributed ledger 142 only have partial necessary contract information of the specific contract excluding the user personal data and the complete contract information of the specific contract including the user personal and/or important data can only be provided to those who has the access permission associated with the specific contract.

In some embodiments, the database 132 may be a storage unit (e.g. a high-speed random access memory (e.g. SRAM or DRAM) and/or non-volatile memory, such as flash memory) (not shown), which may include one or more types of computer readable medium, which stores related data, such as permission setting data for each contract in the distributed ledger 142, a plurality of predefined digital contract templates, each of the predefined contract templates having a contract type corresponding thereto, user-related data (user personal data) and so on.

The distributed ledger 142 is shared among multiple nodes in the network 200 and is used to record and check transactions in a cryptographically secure manner. The distributed ledger 142 may be used to implement a trust structure to provide a distributed consensus among multiple trusted entities. In some embodiments, the distributed ledger 142 may be implemented using a blockchain. The blockchain may include a plurality of blocks, where each block may include a plurality of transactions or contract data. In some embodiments, the plurality of blocks may be ordered, where each newly added block may be linked to a latest previously block. In some embodiments, such a structure may be tamper resistant, and may therefore be used to confirm whether a given transaction did take place, and/or when the transaction took place. For example, a block may be added to the blockchain only if all nodes in a network implementing the blockchain agree on the block. In some embodiments, the distributed consensus may be implemented using a proof-of-work approach. It should be appreciated that aspects of the present disclosure are not limited to the use of the proof-of-work approach. In some embodiments, a Practical *Byzantine* Fault Tolerance (PBFT) approach may be used to achieve distributed consensus. Furthermore, it should be appreciated that any suitable blockchain implementation may be used, including, but not limited to, Ethereum and Hyperledger Fabric. Hyperledger Fabric is a blockchain/distributed ledger system supported by the Linux Foundation and is essentially a distributed repository of peer-to-peer architectures. In this architecture, distributed consensus is maintained by peers in the peer-to-peer architectures, that is, the data in the blockchain (distributed ledger) are jointly maintained by a group of nodes. Consensus algorithms are used between nodes and nodes. Such a system also refers to as a decentralized or multi-center system. Another important characteristic of the blockchain is that it cannot be tampered with. All transaction records are packed into blocks and newly generated blocks are linked to the end of previously existing blockchain, then be hashed to prevent from being tampered with. In this application, the distributed ledger 142 which provides the distributed consensus, such as Hyperledger Fabric blockchain, can serve as the primary repository for digital contract information, thereby permanently preserving contract information of a specific content and preventing related contract information from being tampered with.

It is understood that the contract generator 110, the validation server 120, the first storage device 130 and the second storage device 140 can be implemented by hardware, software or a combination thereof. For example, the contract generator 110, the validation server 120, the database 132 and the distributed ledger 142 can respectively comprise suitable hardware circuits and software program codes to complete respective operations.

Figure 3:
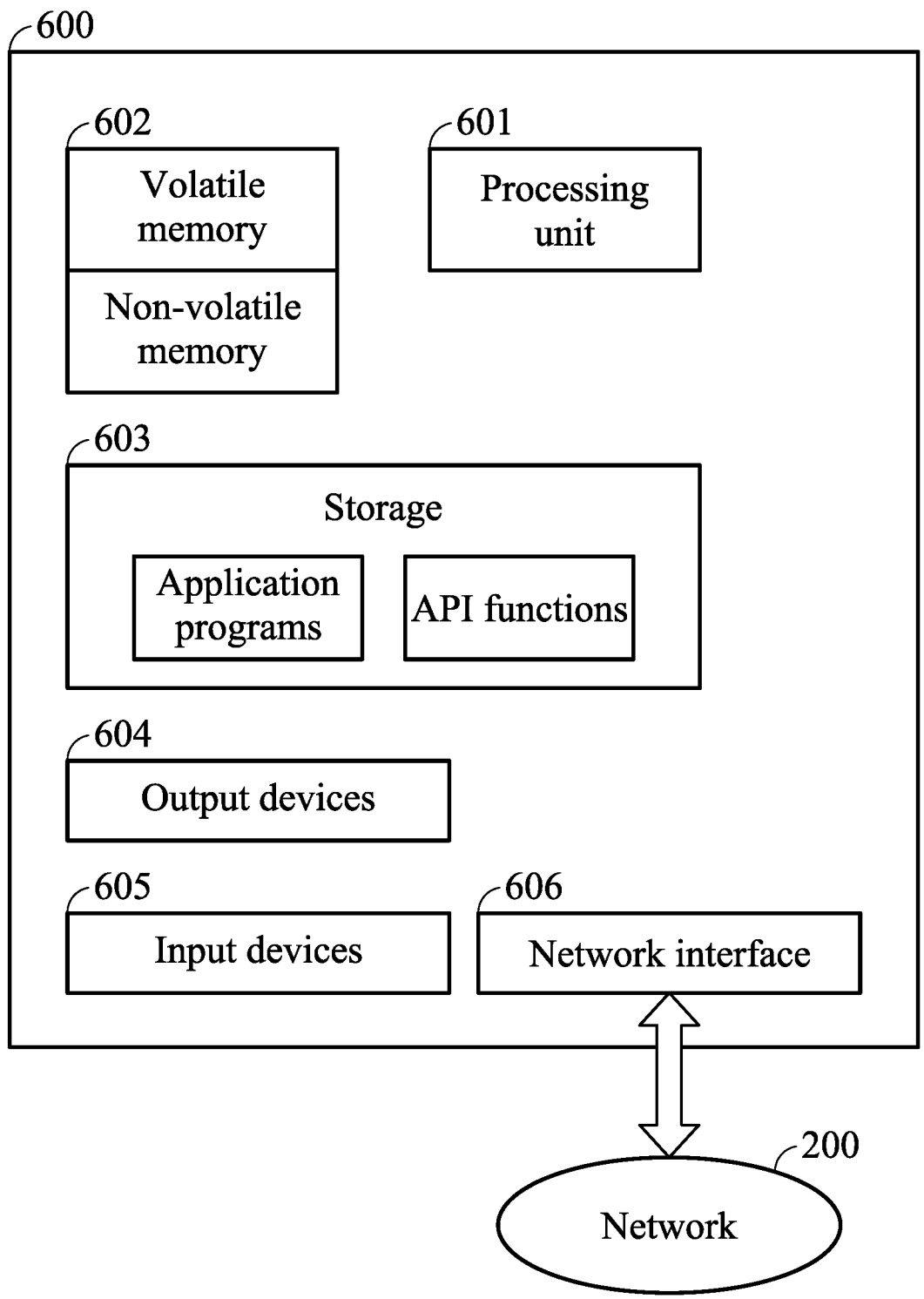
FIG. 3 is a schematic diagram illustrating an exemplary computer according to an embodiment.

FIG. 3 is a schematic diagram illustrating an exemplary computer 600 on which any aspect of the present application may be implemented. The computer 600 can be implemented as the contract generator 110, the validation server 120, the first electronic device 300 and the second electronic device 400. In the embodiment shown in FIG. 3, the computer 600 includes a processing unit 601 having one or more processors and a memory 602 that may include, for example, volatile and/or non-volatile memory. The memory 602 may store one or more instructions to program the processing unit 601 to perform any of the functions described herein. The computer 600 may also include other types of non-transitory computer-readable medium, such as storage 603 (e.g., one or more disk drives) in addition to the memory 602. The storage 603 may also store one or more application programs and/or external components used by application programs (e.g., software libraries), which may be loaded into the memory 602.

The computer 600 may have one or more input devices and/or output devices, such as devices 605 and 604 illustrated in FIG. 3. These devices can be used, among other things, to present a user interface. Examples of output devices 604 that can be used to provide a user interface include printers or display screens for visual presentation of output and speakers or other sound generating devices for audible presentation of output. Examples of input devices 605 that can be used for a user interface include keyboards and pointing devices, such as mice, touch pads, and digitizing tablets. In another example, the input devices 605 may include a microphone for capturing audio signals, and the output devices 604 may include a display screen for visually rendering, and/or a speaker for audibly rendering, recognized text.

As shown in FIG. 3, the computer 600 may also comprise one or more network interfaces (e.g., the network interface 606 (e.g., a communication transceiver)) to enable communication via various networks (e.g., the network 200). Examples of networks include a local area network or a wide area network, such as an enterprise network or the INTERNET. Such networks may be based on any suitable technology and may operate according to any suitable protocol and may include wireless networks, wired networks or fiber optic networks.

The distributed system 100 can perform the method of the present disclosure for access control of contract data, which will be discussed further in the following paragraphs. To be more specific, the distributed system 100 can perform the method of the present disclosure through the aforementioned contract generator 110, the validation server 120, the database 132, and the distributed ledger 142 to provide storing, validation and access control of contract data. Through the validation link provided by the validation server 120 for each contract information of digital contract data stored in the distributed ledger 142, those who with permission for verifying or accessing a specific contract data will be provided with the digital contract data with complete content for subsequent validation or processes and those who with no permission will be forbidden to access or view the complete contract content, so that the contract content can be safely protected and the disclosure of personal privacy can be avoided.

Figure 4:
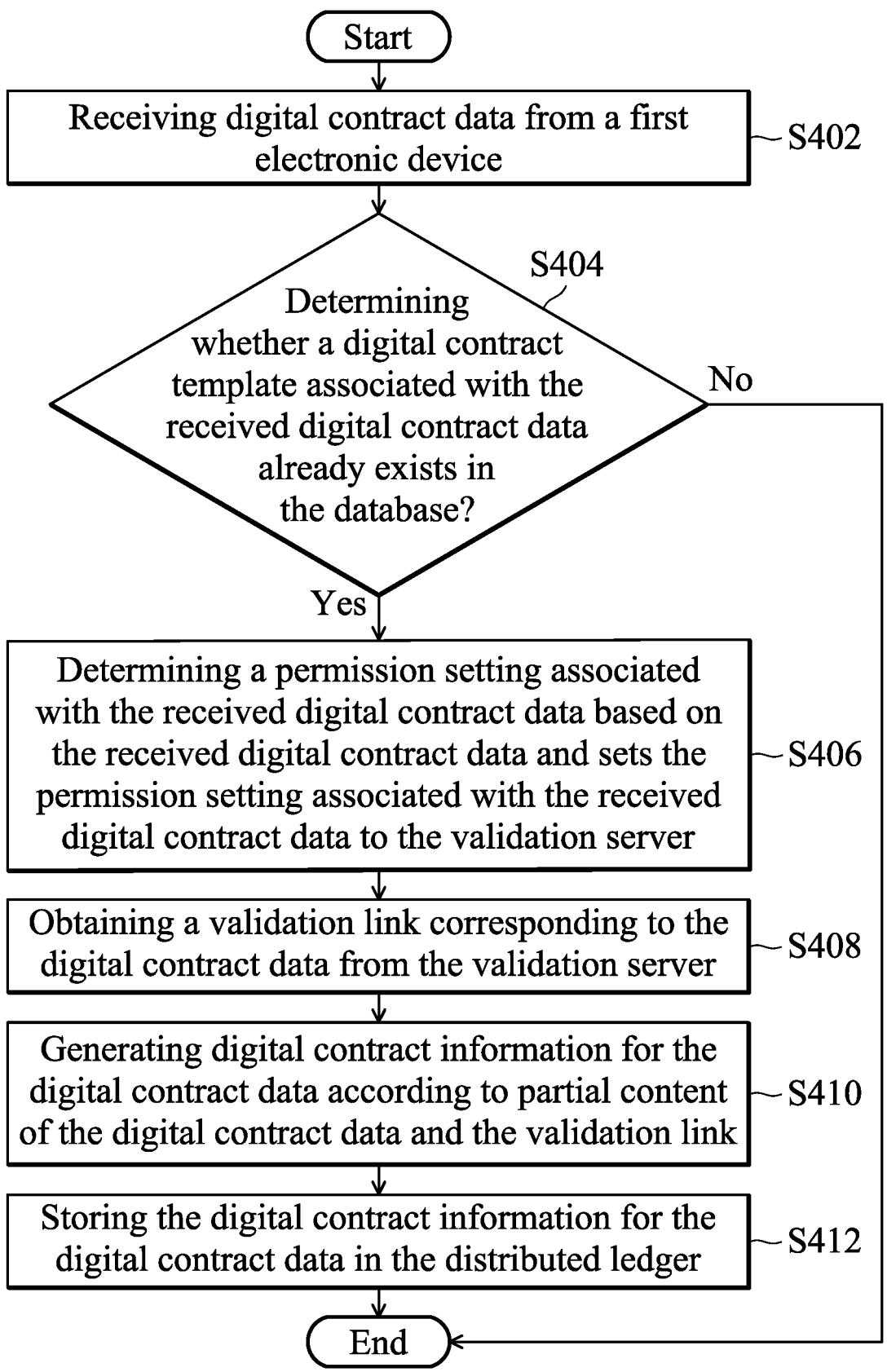
FIG. 4 is a flowchart of a method for access control of contract data in a distributed system with distributed consensus according to an embodiment.

FIG. 4 is a flowchart of a method for access control of contract data in a distributed system with distributed consensus according to an embodiment. The method for access control of contract data can be applied to a distributed system with distributed consensus such as the distributed system 100 of FIG. 1. In this embodiment, it is assumed that the distributed system 100 comprises the contract generator 110, the validation server 120, the first storage device 130, and the second storage device 140. The first storage device 130 stores the database 132. The second storage device 140 provides a distributed ledger 142. The contract generator 110, the validation server 120, the database 132, and the distributed ledger 142 are in communication via the network 200, which may be any wired/wireless communications networks, such as the INTERNET, 3G, and/or WLAN network, blue-tooth network and so on, to perform communication and data transmission therebetween. For example, the contract generator 110 may read data from the database 132 of the first storage device 130 and write data into the database 132 of the first storage device 130 via the network 200. Similarly, the contract generator 110 may read data from the distributed ledger 142 of the second storage device 140 and write data into the distributed ledger 142 of the second storage device 140 via the network 200. It should be note that, in this embodiment, the contract generator 110 may have a hardware architecture implemented as same as the computer 600 as shown in FIG. 3, which at least includes a network interface, a memory and a processor. More particularly, the network interface is configured to provide connection to the network 200 to couple to the validation server 120, the database 132 and the distributed ledger 142, and the processor is configured to coordinate the operations of the network interface and the memory for performing the method for access control of contract data of the present application at the contract generator 110.

First, when a user of the first electronic device 300 requests to store content of digital contract data into the distributed system 100, in step S402, the contract generator 110 receives digital contract data from the first electronic device 300 via the network 200.

Upon receiving the digital contract data from the first electronic device 300, in step S404, the contract generator 110 determines whether a digital contract template associated with the received digital contract data already exists in the database 132. To be more specific, the received digital contract data has a corresponding contract type and the database 132 has pre-stored a plurality of digital contract templates, wherein each digital contract template has a corresponding contract type. The contract generator 110 first obtains the contract type for the received digital contract data and then uses the obtained contract type to find a match among the contract types within the digital contract templates pre-stored in the database 132. If a match can be found, the contract generator 110 determines that a digital contract template associated with the received digital contract data already exists in the database 132. If no match can be found, the contract generator 110 determines that the digital contract template associated with the received digital contract data does not exist in the database 132.

In response to determining that the digital contract template associated with the received digital contract data does not exist in the database 132 (No in step S404), which means that the contract type of the received digital contract data does not belong to any of the predetermined contract types which can be processed, it is determined as an incorrect or invalid contract data and thus the flow ends. In other words, the received digital contract data may be referred to as an invalid contract data and thus it will not be stored into the distributed ledger 142.

Contrarily, in response to determining that the digital contract template associated with the received digital contract data already exists in the database 132 (Yes in step S404), in step S406, the contract generator 110 determines a permission setting associated with the received digital contract data based on the received digital contract data and sets the permission setting associated with the received digital contract data to the validation server 120 via the network 200. As content of the received digital contract data may provide information indicating which users can access (e.g., read or review) the complete contract content, the contract generator 110 can determine a permission setting associated with each received digital contract data based on the content of the digital contract data. For example, in one embodiment, it is assumed that the digital contract data can be related to a contract of renting a car, and the permission setting associated with such digital contract data can be set as a user A who wants to rent the car, a user B which is the rental company providing the renting car service, and a user C which is an insurance company corresponding thereto. Thus, the permission setting associated with this digital contract data can be {A, B, C}. In other words, in this embodiment, only the accessing request for reading the digital contract data from the user A, B or C can be accepted, and the request for reading the digital contract data from another user D which may be a hacker or other user will be automatically rejected.

After setting the permission setting associated with the digital contract data to the validation server 120, in step S408, the contract generator 110 obtains a validation link corresponding to the digital contract data from the validation server 120 via the network 200. To be more specific, when receiving the permission setting associated with the digital contract data from the contract generator 110, the validation server 120 stores the permission setting associated with the digital contract data, generates a validation link for subsequent contract data validation accordingly, and transmits the validation link corresponding to the contract data to the contract generator 110 via the network 200. Thus, the contract generator 110 can obtain the validation link corresponding to the digital contract data from the validation server 120 via the network 200. In this embodiment, the validation link is a URI which can be in the form of the URL or URN, such as a hyper link of "http://www.aaa.bbb.cc/#0001" or an application link of "APP1://20170901001", but the disclosure is not limited thereto.

After obtaining the validation link corresponding to the digital contract data, in step S410, the contract generator 110 generates digital contract information for the digital contract data according to partial content of the digital contract data and the validation link and as in step S412, after the contract information for the digital contract data has been generated, stores the digital contract information for the digital contract data in the distributed ledger 142. For example, the contract information stored in the distributed ledger 142 can be in the form as the same as the contract information 500 shown in FIG. 2. In one embodiment, the digital contract data may include a first portion of public data (e.g., necessary contract information excluding user personal or privacy data) and a second portion of private or secure data (e.g., the user personal or privacy data), and the contract generator 110 can remove the second portion of private or secure data from the digital contract data to generate the partial content of the digital contract data and stores only the second portion of private or secure data into the database 132.

After the contract information has been stored in the distributed ledger 142, accessing of a complete content of the digital contract data can be controlled based on the validation link included in the contract information. To be more specific, when digital contract information (e.g., necessary contract information excluding user personal or privacy data) of a specific digital contract data stored in the distributed ledger 142 is later accessed by a user of another electronic device (e.g., the second electronic device 400), a permission validation process can be performed to determine whether the electronic device has the permission to read the digital contract data based on the permission setting associated with this digital contract data. The permission validation process can only be triggered based on the validation link and the complete content of the digital contract data can only be provided to the user when the permission validation process is passed.

Figure 5:
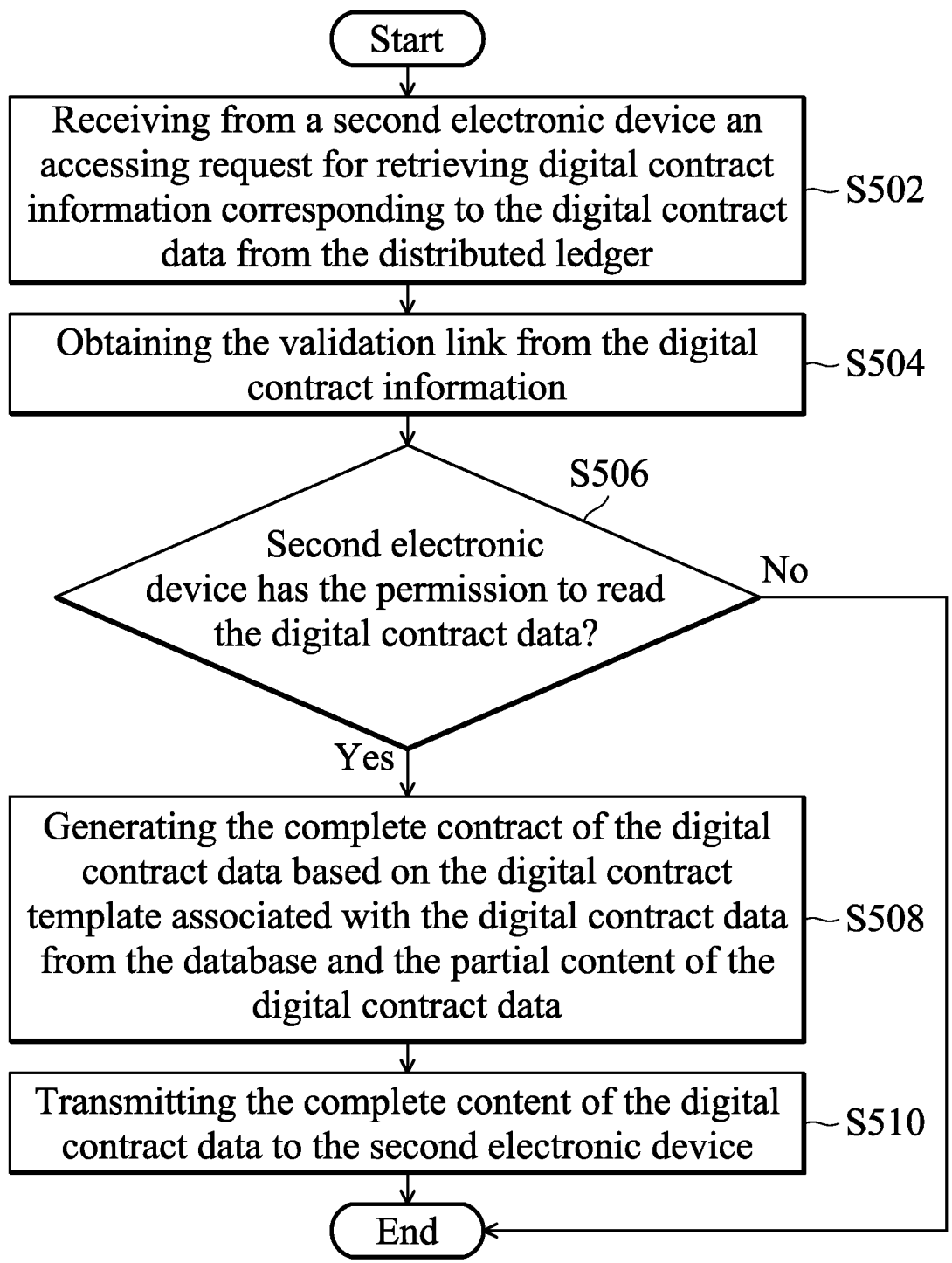
FIG. 5 is a flowchart of a method for access control of contract data in a distributed system with distributed consensus according to another embodiment.

FIG. 5 is a flowchart of a method for access control of contract data in a distributed system with distributed consensus according to another embodiment. The method for access control of contract data can be applied to a distributed system with distributed consensus such as the distributed system 100 of FIG. 1. It should be note that, in this embodiment, the validation server 120 may have a hardware architecture implemented as same as the computer 600 as shown in FIG. 3, which at least includes a network interface, a memory and a processor. More particularly, the network interface is configured to provide connection to the network 200 to couple to the contract generator 110, the database 132 and the distributed ledger 142, and the processor is configured to coordinate the operations of the network interface and the memory for performing the method for access control of contract data of the present application at the validation server 120.

When a user of a second electronic device (e.g., the second electronic device 400) retrieves the digital contract information corresponding to the digital contract data from the distributed ledger 142, the validation server 120 receives from the second electronic device 400 an accessing request for retrieving digital contract information corresponding to the digital contract data from the distributed ledger 142 (step S502), wherein the digital contract information comprises a validation link. In this embodiment, the digital contract information may at least include the partial content of the digital contract data and the validation link, such as the digital contract information 500 as shown in FIG. 2.

Then, the validation server 120 obtains the validation link from the digital contract information (step S504) and performs a permission validation process to determine whether the second electronic device has the permission to read the digital contract data using the validation link (step S506). In this step, the validation server 120 obtains the permission setting for accessing contract content associated with the digital contract data from the database 132 through the validation link obtained in step S504 and determines whether the second electronic device (e.g. by a user ID code of the second electronic device) has the permission to access this digital contract data according to the permission setting obtained. If the permission setting does not include the second electronic device, it is determined that the second electronic device has no permission to read the contract data. Contrarily, if the permission setting includes the user of the second electronic device, it is determined that the second electronic device has the permission to read the contract data. Furthermore, when the validation server 120 determines that the user does not have the permission to read or access the contract data (No in step S506), it rejects the request from the second electronic device and the flow ends.

In response to determining that the second electronic device has the permission to read the content of the digital contract data (Yes in step S506), the validation server 120 generates the complete contract of the digital contract data based on the digital contract template associated with the digital contract data from the database 132 and the partial content of the digital contract data (step S508) and transmitting the complete content of the digital contract data to the second electronic device (step S510). To be more specific, the validation server 120 may first find a contract template in the predetermined contract templates of the database 132 according to the digital contract information being retrieved, applies the contract information to the found contract template to reconstruct a digital contract data contract with complete contract content. In some embodiments, the validation server 120 further obtains another portion of content information from the database 132 and applies the partial content of the digital contract data and another portion of content information to the found contract template so as to reconstruct the complete contract content of the digital contract data contract.

In some embodiments, the digital contract information may further comprise a first hash value associated with the digital contract information that is generated by applying a hash function on the partial content of the digital contract data and the validation link by the contract generator 110. In one embodiment, the first hash code can be defined, for example, as follows: first hash code=hash (contract data, validation link), where hash (x,y) represents a hash function being used on x and y. In such case, the validation server 120 may first determine whether the first hash value associated with the digital contract information is correct to determine whether to reject the accessing request directly prior to obtaining the validation link from the digital contract information. Specifically, the validation server 120 confirms whether a second hash value calculated by applying the same hash function on the contract data and the validation link included in the contract information matches the first hash value, and only determines that the first hash value associated with the contract information is correct if the two hash values match. The validation server 120 may reject the accessing request from the second electronic device in response to determining that the first hash value is not correct, and the validation server 120 may obtain the validation link from the digital contract information in response to determining that the first hash value is correct.

In some embodiments, the digital contract information may further include an electronic signature or a digital signature in addition to the partial contract data, the validation link, and the first hash value for the contract data.

Following embodiments illustrate an implementation using the Hyperledger Fabric blockchain as an example for illustration purpose, but the disclosure is not limited thereto. In this embodiment, the distributed ledger 142 which provides the distributed consensus, such as Hyperledger Fabric blockchain, can serve as the primary repository for contract information, thereby permanently preserving contract information and preventing contract information from being tampered with.

In this embodiment, a customer (party A) rented a car from the rental car company (party B) and a contract CT is set between the customer (party A) and the car rental company (party B), thus resulting in a contractual agreement signed by both parties. The contract will be later provided to a third party (e.g., an insurance company) (party C) for validation. In such scenario, the permission setting for verifying the content of the contract CT can be set as the party A, the party B and the party C. In other words, others (such as: a party D) are not allowed to verify and access the contract of the contract CT.

Figure 6:
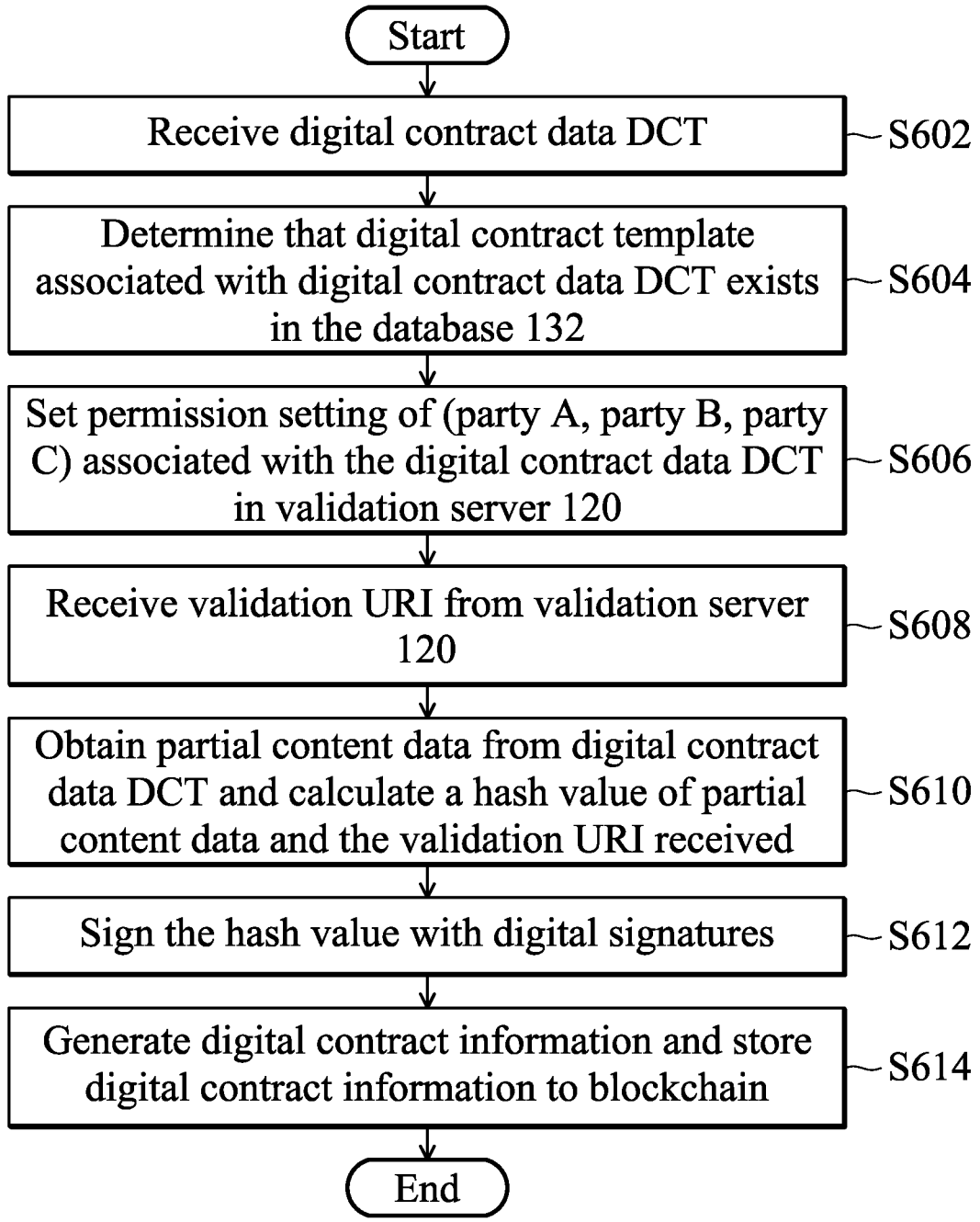
FIG. 6 is a flowchart of a method for access control of contract data in a distributed system with distributed consensus according to yet another embodiment.

FIG. 6 is a flowchart of a method for access control of contract data in a distributed system with distributed consensus according to another embodiment. The method for access control of contract data can be applied to a distributed system with Hyperledger Fabric blockchain such as the distributed system 100 of FIG. 1. In this embodiment, a digital contract data DCT of the contract CT is sent, by the party A or the party B using an electronic device, to the distributed system 100. Upon receiving the digital contract data DCT (step S602), the contract generator 110 determines whether the digital contract template associated with the digital contract data DCT exists in the database 132. If there is no digital contract template associated with the digital contract data DCT in the database 132 (No in step S604), which means that this digital contract template was not previously defined, this digital contract data is determined to be incorrect contract and thus content of the digital contract data will not be recorded in the distributed system 100. Conversely, if the digital contract template associated with the digital contract data DCT exists in the database 132, it means that the digital contract template was previously defined in the database 132 and the digital contract data can be further processed. In this embodiment, it is assumed that the contract generator 110 determines that the digital contract template associated with the digital contract data DCT exists in the database 132 (step S604). As the digital contract data DCT should be verified by the customer, the rental company and the insurance company, a permission setting of (party A, party B, party C) associated with the digital contract data DCT and determined by the contract generator 110 and transmitted to the validation server 120 for setting it in the validation server 120 and the related permission settings are stored in the database 132 for subsequent inquiry and validation use (step S606). The validation server 120 then sets the permission settings associated with this digital contract data DCT, and after the permission settings have been set, it generates a validation URI which is used for subsequent permission validation and returns the validation URI to the contract generator 110.

Upon receiving the validation URI (e.g., a hyper link of "http://www.aaa.bbb.cc/#0001" or an application link of "APP1://201709 01001") from the validation server 120 (step S608), the contract generator 110 takes the partial contract information out of the digital contract data DCT and calculates a hash value of the partial content data and the validation URI received (step S610), sign the hash value with one or more electronic or digital signatures corresponding to the digital contract data DCT (step S612) and adds the partial contract data along with the validation URI, the hash value and the digital signatures to generate digital contract information to be stored and writes the digital contract information to be stored to the distributed ledger (e.g., the blockchain) 142 for storage (step S614). According to the aforementioned steps, the contract information of the digital contract data DCT can be written into a tamper-resist distributed system 100 to ensure the authenticity of the digital contract data. To be more specific, the digital contract data DCT may include a first portion of necessary contract data or public data and a second portion of secure or private data such as user personal data and important data, and the contract generator 110 may take the first portion of contract data as the partial contract data to be stored in the distributed ledger 142 and stores the second portion of secure data in the database 132.

Thereafter, the insurance company (party C) may like to check the contract CT between the customer (party A) and the car rental company (party B) for certain reasons, such as, when charging related insurance premiums or paying money for an car accident, the insurance company needs to verify the complete contract content for subsequent actions.

Figure 7:
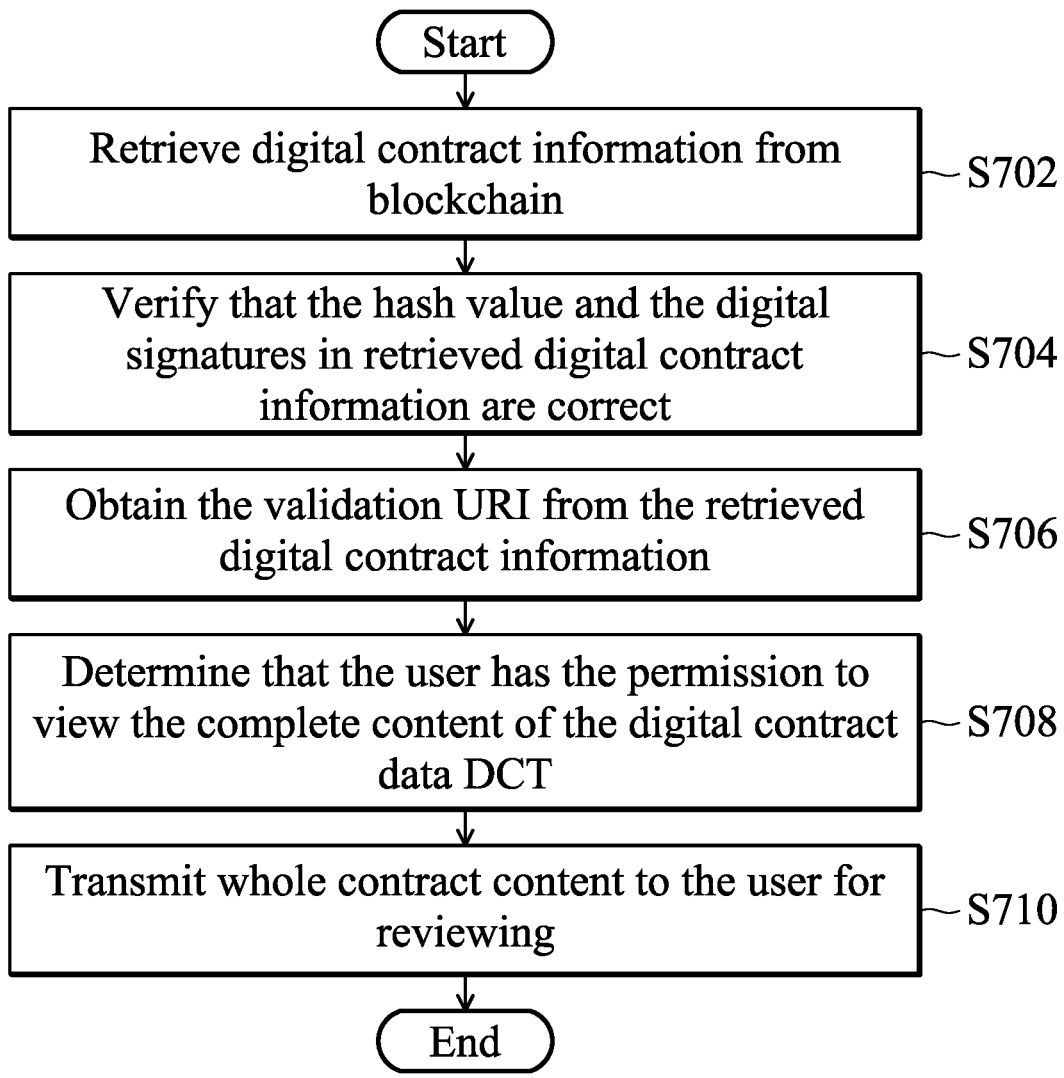
FIG. 7 is a flowchart of a method for access control of contract data in a distributed system with distributed consensus according to still another embodiment.

FIG. 7 is a flowchart of a method for access control of contract data in a distributed system with distributed consensus according to another embodiment. The method for access control of contract data can be applied to a distributed system with Hyperledger Fabric blockchain such as the distributed system 100 of FIG. 1. As shown in FIG. 7, the insurance company (the party C) firstly requests for retrieving the digital contract information corresponding to the in the Hyperledger Fabric blockchain through the validation server 120, and the digital contract information includes the hash value, the digital signatures and the validation URI, which can be validated when it is sent to the validation server 120. The validation server 120 then retrieves digital contract information corresponding to the digital contract data DCT from the Hyperledger Fabric blockchain (step S702) and performs a validation process to verify whether the hash value and the digital signatures are correct. In this embodiment, the hash value and the digital signatures are determined to be correct, and the validation server 120 verifies that the hash value and the digital signatures are correct (step S704) and then obtains the validation URI from the retrieved digital contract information (step S706) to confirm whether the user (the party C) has a permission to verify this digital contract data DCT through the permission setting associated with this digital contract data DCT in the database 132 based on the validation URI. As described above, the permission setting associated with the digital contract data DCT is set as (party A, party B, party C). As the permission for the insurance company (the party C) to access this digital contract data DCT has previously been set in the database 132, the insurance company will be treated as one who has permission to verify the digital contract data DCT during the validation process and thus the validation server 120 determines that the user has the permission to view or verify the complete content of the digital contract data DCT (step S708). The validation server 120 then combines the partial content of the digital contract data DCT included in the contract information and other content (e.g., the user personal data) corresponding thereto in the database 132 together with the respective digital contract template to generate a complete content of the digital contract data DCT, and sends back the digital contract data DCT with complete content to the user (i.e., the insurance company) to show the whole contract content for validation and reviewing (step S710). In another embodiment, if a party D (e.g., an unrelated or unauthorized insurance company) also wants to check the contract CT, as the party D has no permission to access the digital contract data DCT for the contract CT, the validation server 120 will reject the access request from the party D and will not provide the complete content of the digital contract data DCT to the party D. Thus, access control of the contract data can be provided.

Similarly, in the above embodiments, as information of the validation server comes from the Hyperledger Fabric blockchain, the authenticity of the contract can be ensured and the permission setting is made accessible only to those who have the permissions for accessing the contract, thus protecting the contract data and preventing the contract from being accessed by unrelated persons.

Therefore, with the distributed system for access control of contract data with distributed consensus and related methods for access control of contract data of the present application, the contract data can be permanently recorded in a tamper-resistant distributed storage media (e.g., a distributed ledger) to prevent the contract data from being tampered with, thus making the contract transparent and ensuring and improving the authenticity of the contract. Moreover, only the relevant parties with the authority/permission are allowed to verify the complete contract content, thus protecting the contract content from being verified or accessed by unauthorized persons and preventing the disclosure of personal privacy.

The methods, or certain aspects or portions thereof, may take the form of a program code (i.e., executable instructions) embodied in tangible media, such as floppy diskettes, CD-ROMS, hard drives, or any other non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A computer-implemented method for access control of contract data in a distributed system with distributed consensus, wherein the distributed system comprises a contract generator, a validation server, a first storage device storing a database and a second storage device providing a distributed ledger, wherein at the contract generator, the method comprising:
   receiving digital contract data from a first electronic device via a network;
   determining a permission setting for accessing contract content associated with the digital contract data based on the digital contract data, and setting the permission setting associated with the digital contract data to the validation server via the network;
   obtaining a validation link for validating the permission setting associated with the digital contract data from the validation server via the network;
   generating digital contract information for the digital contract data according to partial content of the digital contract data and the validation link; and
   storing the digital contract information in the distributed ledger of the second storage device,
   wherein accessing of a complete content of the digital contract data is controlled based on the validation link,
   wherein the method further comprises:
   receiving, at the validation server, an accessing request from a second electronic device for retrieving the digital contract information corresponding to the digital contract data from the distributed ledger via the network;
   obtaining, at the validation server, the validation link from the digital contract information;
   performing, at the validation server, a permission validation process to determine whether the second electronic device has the permission to read the digital contract data using the validation link;
   in response to determining that the second electronic device has no permission to read the digital contract data, rejecting, at the validation server, the accessing request from the second electronic device; and
   in response to determining that the second electronic device has the permission to read the digital contract data, generating, at the validation server, the complete content of the digital contract data based on a digital contract template associated with the digital contract data from the database and the partial content of the digital contract data and transmitting the complete content of the digital contract data to the second electronic device.

2. The method of claim 1, further comprising:
   prior to determining the permission setting for accessing contract content associated with the digital contract data, determining whether a digital contract template associated with the digital contract data already exists in the database,
   wherein the permission setting for accessing contract content associated with the digital contract data is determined based on the digital contract data only when determining that the digital contract template associated with the contract data already exists in the database of the first storage device.

3. The method of claim 1, wherein the digital contract information further comprises a first hash value generated by applying a hash function on the partial content of the digital contract data and the validation link.

4. The method of claim 3, wherein the digital contract information further comprises an electronic signature or a digital signature.

5. The method of claim 4, further comprising:
   prior to obtaining the validation link from the digital contract information, determining, at the validation server, whether the first hash value associated with the digital contract information is correct;
   in response to determining that the first hash value is not correct, rejecting, at the validation server, the accessing request from the second electronic device; and
   in response to determining that the first hash value is correct, obtaining, at the validation server, the validation link from the digital contract information.

6. The method of claim 1, wherein the distributed ledger is implemented using at least one blockchain.

7. The method of claim 1, wherein the validation link is a uniform resource identifier (URI) for validating the permission setting associated with the digital contract information.

8. The method of claim 1, wherein the digital contract data includes a first portion of public data and a second portion of private or secure data and the method further comprising:
removing the second portion of private or secure data from the digital contract data, at the contract generator, to generate the partial content of the digital contract data; and
storing, at the contract generator, the second portion of private or secure data into the database.

9. A contract generator for access control of contract data in a distributed system with distributed consensus, comprising:
a network interface coupled to a validation server, a distributed ledger and a database via a network;
a memory; and
a processor coupled to the network interface and the memory, configured to perform the following operations:
receiving digital contract data from a first electronic device via the network;
determining a permission setting for accessing contract content associated with the digital contract data based on the digital contract data, and setting the permission setting associated with the digital contract data to the validation server via the network;
obtaining a validation link for validating the permission setting associated with the digital contract data from the validation server via the network;
generating digital contract information for the digital contract data according to partial content of the digital contract data and the validation link; and
storing the digital contract information in the distributed ledger of the second storage device,
wherein accessing of a complete content of the digital contract data is controlled based on the validation link,
wherein the validation server further executes:
receiving an accessing request from a second electronic device for retrieving the digital contract information corresponding to the digital contract data from the distributed ledger via the network;
obtaining the validation link from the digital contract information;
performing a permission validation process to determine whether the second electronic device has the permission to read the digital contract data using the validation link;
in response to determining that the second electronic device has no permission to read the digital contract data, rejecting the accessing request from the second electronic device; and
in response to determining that the second electronic device has the permission to read the digital contract data, generating the complete content of the digital contract data based on a digital contract template associated with the digital contract data from the database and the partial content of the digital contract data and transmitting the complete content of the digital contract data to the second electronic device.

10. The contract generator of claim 9, wherein the processor is further configured to determine whether a digital contract template associated with the digital contract data already exists in the database prior to determining the permission setting for accessing contract content associated with the digital contract data,
wherein the processor determines the permission setting for accessing contract content associated with the digital contract data based on the digital contract data only when determining that the digital contract template associated with the contract data already exists in the database of the first storage device.

11. The contract generator of claim 9, wherein the digital contract data includes a first portion of public data and a second portion of private or secure data and the processor is further configured to perform the following operations:
removing the second portion of private or secure data from the digital contract data to generate the partial content of the digital contract data; and
storing the second portion of private or secure data into the database via the network.

12. The contract generator of claim 9, wherein the distributed ledger is implemented using at least one blockchain.

13. The contract generator of claim 9, wherein the validation link is a uniform resource identifier (URI) for validating the permission setting associated with the digital contract information.

14. A validation server for access control of contract data in a distributed system with distributed consensus, comprising:
a network interface coupled to a distributed ledger storing digital contract information of digital contract data received from a first electronic device and a database via a network, wherein the digital contract information of digital contract data includes partial content of the digital contract data and a validation link;
a memory; and
a processor coupled to the memory and the network interface, configured to perform the following operations:
receiving an accessing request from a second electronic device for retrieving the digital contract information corresponding to digital contract data from the distributed ledger via the network;
obtaining the validation link from the digital contract information;
performing a permission validation process to determine whether the second electronic device has the permission to read the digital contract data using the validation link;
rejecting the accessing request from the second electronic device in response to determining that the second electronic device has no permission to read the digital contract data; and
generating a complete content of the digital contract data based on a digital contract template associated with the digital contract data from the database and the partial content of the digital contract data and transmitting the complete content of the digital contract data to the second electronic device in response to determining that the second electronic device has the permission to read the digital contract data.

15. The validation server of claim 14, wherein the digital contract information further comprises a first hash value generated by applying a hash function on the partial content of the digital contract data and the validation link.

16. The validation server of claim 15, wherein the processor is further configured to perform the following operations:

determining whether the first hash value associated with the digital contract information is correct prior to obtaining the validation link from the digital contract information, wherein the processor rejects the accessing request from the second electronic device in response to determining that the first hash value is not correct and obtains the validation link from the digital contract information in response to determining that the first hash value is correct.

17. The validation server of claim 14, wherein the distributed ledger is implemented using at least one blockchain.

18. The validation server of claim 14, wherein the validation link is a uniform resource identifier (URI) for validating the permission setting associated with the digital contract information by the validation server.

19. The validation server of claim 14, wherein the digital contract data includes a first portion of public data and a second portion of private or secure data, and the partial contract information for the digital contract data contains only the first portion of public data.

20. The contract generator of claim 9, wherein the digital contract information further comprises a first hash value generated by applying a hash function on the partial content of the digital contract data and the validation link.

* * * * *